US010871198B2

(12) United States Patent
Caron-L'Ecuyer et al.

(10) Patent No.: US 10,871,198 B2
(45) Date of Patent: Dec. 22, 2020

(54) ISOLATION MOUNT

(71) Applicant: BOMBARDIER INC., Montreal (CA)

(72) Inventors: Alexis Caron-L'Ecuyer, Montreal (CA); Andre Brodeur, Laval (CA)

(73) Assignee: BOMBARDIER INC., Dorval (CA)

( * ) Notice: Subject to any disclaimer, the term of this patent is extended or adjusted under 35 U.S.C. 154(b) by 58 days.

(21) Appl. No.: 16/099,739

(22) PCT Filed: May 1, 2017

(86) PCT No.: PCT/US2017/030365
§ 371 (c)(1),
(2) Date: Nov. 8, 2018

(87) PCT Pub. No.: WO2017/196568
PCT Pub. Date: Nov. 16, 2017

(65) Prior Publication Data
US 2019/0136930 A1    May 9, 2019

Related U.S. Application Data

(60) Provisional application No. 62/334,608, filed on May 11, 2016.

(51) Int. Cl.
*F16F 1/373* (2006.01)
*B64C 1/06* (2006.01)
(Continued)

(52) U.S. Cl.
CPC ............ *F16F 1/3732* (2013.01); *B64C 1/066* (2013.01); *F16B 5/0241* (2013.01); *B64C 1/40* (2013.01);
(Continued)

(58) Field of Classification Search
CPC .. F16F 1/3732; F16F 1/50; F16F 1/373; F16F 7/00
(Continued)

(56) References Cited

U.S. PATENT DOCUMENTS 2,115,458 A    4/1938    Geyer
2,115,713 A    5/1938    Haire
(Continued)

FOREIGN PATENT DOCUMENTS

DE    19802390 A1    10/1998
WO    2013122811 A1    8/2013

OTHER PUBLICATIONS

International Preliminary Report on Patentability dated Nov. 22, 2018, for International Patent Application No. PCT/US2017/030365.
(Continued)

*Primary Examiner* — Robert A. Siconolfi
*Assistant Examiner* — San M Aung
(74) *Attorney, Agent, or Firm* — Karceski IP Law, PLLC

(57) ABSTRACT

An isolation mount connecting a panel to a structure includes a housing disposable on the structure, a fastener receiver with a panel-facing surface, and a damper connecting the housing to the fastener receiver. The panel-facing surface of the fastener receiver defines a static coefficient of friction between the panel-facing surface and the panel discouraging rotation of panel-facing surface around a longitudinal axis.

16 Claims, 6 Drawing Sheets

(51) Int. Cl.
  *F16B 5/02* (2006.01)
  *F16B 5/04* (2006.01)
  *F16B 5/08* (2006.01)
  *F16B 11/00* (2006.01)
  *B64C 1/40* (2006.01)

(52) U.S. Cl.
  CPC . *F16B 5/04* (2013.01); *F16B 5/08* (2013.01); *F16B 11/006* (2013.01)

(58) Field of Classification Search
  USPC ......... 267/141, 141.4, 141.7, 140.11, 140.13
  See application file for complete search history.

(56) References Cited

U.S. PATENT DOCUMENTS

| | | | | |
|---|---|---|---|---|
| 2,132,840 | A | * | 10/1938 | Workman ............. F16F 1/3732 267/141.4 |
| 2,208,532 | A | * | 7/1940 | Woodward ............ F16F 1/3732 411/187 |
| 2,538,658 | A | * | 1/1951 | Saurer ................... F16F 1/3732 267/141.5 |
| 3,193,237 | A | | 7/1965 | Adams |
| 4,012,071 | A | * | 3/1977 | Jones ................... B60G 99/004 296/35.1 |
| 4,286,642 | A | | 9/1981 | Keatley |
| 4,442,647 | A | | 4/1984 | Olsen |
| 4,739,955 | A | | 4/1988 | Aquino et al. |
| 4,765,436 | A | | 8/1988 | Dowell |
| 4,971,496 | A | | 11/1990 | Scholz |
| 5,121,905 | A | * | 6/1992 | Mann ..................... F16F 1/371 267/136 |
| 5,876,024 | A | | 3/1999 | Hain |
| 6,158,690 | A | | 12/2000 | Wadey et al. |
| 8,864,116 | B2 | | 10/2014 | Jung |
| 2002/0145241 | A1 | | 10/2002 | Rawson |
| 2003/0205855 | A1 | * | 11/2003 | Halladay ................. F16F 7/09 267/140.13 |
| 2008/0067726 | A1 | | 3/2008 | Rawson |
| 2009/0179111 | A1 | | 7/2009 | Ebner et al. |
| 2010/0116584 | A1 | | 5/2010 | Sanetick et al. |
| 2013/0168908 | A1 | | 7/2013 | Loret de Mola |
| 2014/0197278 | A1 | | 7/2014 | Cheung et al. |
| 2015/0211592 | A1 | * | 7/2015 | Rawson ................... F16F 1/41 267/141.1 |

OTHER PUBLICATIONS

International Search Report and Written Opinion dated Sep. 8, 2017, for International Patent Application No. PCT/US2017/030365.

* cited by examiner

ISOLATION MOUNT

CROSS-REFERENCE TO RELATED APPLICATION(S)

This is a National Stage Entry into the United States Patent and Trademark Office from International PCT Patent Application No. PCT/US2017/030365, having an international filing date of May 1, 2017, which relies for priority on U.S. Provisional Patent Application Ser. No. 62/334,608, entitled "ISOLATION MOUNT," filed May 11, 2016, the entire content contents of both of which are hereby incorporated by reference.

FIELD OF THE INVENTION

The present invention concerns an isolation mount for connecting two structures together. The isolation mount minimizes transmission of vibration from one structure to the other. More specifically, the present invention provides an isolation mount that connects a panel, for the interior of a vehicle, to the structure of the vehicle. Even more specifically, the present invention concerns an isolation mount for connecting an interior cabin panel to the structure of the fuselage of an aircraft.

DESCRIPTION OF THE BACKGROUND AND RELATED ART

As should be apparent to those skilled in the art, isolation mounts are employed in the manufacture of aircraft to connect interior cabin panels to the aircraft structure. In particular, isolation mounts are positioned between the panels on the interior cabin of the aircraft and the fuselage structure, which may be referred to as the "green structure" of the aircraft.

The isolation mounts establish a vibration barrier between the aircraft structure (i.e., the fuselage) and the interior cabin panels by minimizing the transmission of vibrations from the aircraft structure to the interior cabin panels. The isolation mounts also minimize the transmission of sound from the exterior of the aircraft to the passenger cabin.

Typically, several isolation mounts are required to connect a single interior panel to the aircraft structure. As a result, it is possible that hundreds or thousands of isolation mounts may be employed when assembling the cabin of the aircraft. As should be apparent to those skilled in the art, the number of isolation mounts employed depends, at least in part, on the size of the aircraft and on its interior configuration.

In many prior art examples, isolation mounts rely on rubber as a damping material between the interior panel and the aircraft structure. As discussed in greater detail herein, under certain circumstances, it is possible for the rubber material to become damaged during installation and/or removal of the interior panel.

Once the rubber is damaged, the isolation mount may not function as intended, thereby degrading the ability of the isolation mount to inhibit the transmission of vibrations and sound. As a result, the interior of the cabin may be noisier and less comfortable for passengers.

In view of the possibility of a partial or total failure of one or more isolation mounts on an aircraft, a need has developed to improve upon the construction of known isolation mounts.

SUMMARY OF THE INVENTION

The present invention addresses one or more of the deficiencies with respect to the prior art.

Accordingly, the present invention provides for an isolation mount connecting a panel to a structure including a housing disposable on the structure, a fastener receiver having a panel-facing surface, and a damper connecting the housing to the fastener receiver. The panel-facing surface of the fastener receiver defines a static coefficient of friction between the panel-facing surface and the panel discouraging rotation of panel-facing surface around a longitudinal axis.

The present invention contemplates that a layer of material disposed on the fastener receiver defines the panel-facing surface.

Still further, the layer of material may be an elastomeric material, rubber, a tacky material, and/or a releasable adhesive.

In another contemplated embodiment of the isolation mount, the panel-facing surface may be one of a knurled, grinded, or serrated surface.

It is contemplated that the static coefficient of friction between the panel-facing surface and the panel is greater than or equal to 1.5.

In one contemplated embodiment of the isolation mount, the fastener receiver includes a body and a plate in fixed relationship with the body, wherein the plate defines the panel-facing surface.

For another embodiment, the housing may include a damper case enclosing the damper and a base connected to the damper case, where the base is connectable to the structure.

Where the base is connectable to the structure, the base may be connectable to the structure by at least one structure fastener.

For an embodiment of the isolation mount, the fastener receiver may include a body, a flange disposed at one end of the body, interior to the housing, and a receiver opening in the body for receiving a panel fastener therein, permitting the fastener receiver to be connected to the panel.

It is contemplated that the damper may be made from an elastomeric material.

The present invention also encompasses a vehicle that includes a structure, a panel, and a plurality of isolation mounts connecting the panel to the structure. Each isolation mount is contemplated to include a housing disposed on the structure, a fastener receiver comprising a panel-facing surface, and a damper connecting the housing to the fastener receiver. The panel-facing surface of the fastener receiver defines a static coefficient of friction between the panel-facing surface and the panel discouraging rotation of the panel-facing surface around a longitudinal axis.

For the vehicle, a layer of material disposed on the fastener receiver may define the panel-facing surface.

It is contemplated that the layer of material may be at least one of an elastomeric material, rubber, a tacky material, and a releasable adhesive.

Still further, the panel-facing surface may be one of a knurled, grinded, or serrated surface.

It is contemplated that the static coefficient of friction between the panel-facing surface and the panel is greater or equal to than 1.5.

In one contemplated embodiment of the vehicle, the structure includes part of an aircraft fuselage and the panel forms part of an aircraft interior cabin.

In another contemplated embodiment of the vehicle, the fastener receiver includes a body and a plate in fixed relationship with the body. The plate defines the panel-facing surface.

It is contemplated that the housing may include a damper case enclosing the damper and a base connected to the damper case, where the base connects to the structure.

In an additional contemplated embodiment, the fastener receiver includes a body, a flange disposed at one end of the body, interior to the housing, and a receiver opening in the body for receiving a panel fastener therein, permitting the fastener receiver to be connected to the panel.

It is contemplated that the damper is made from an elastomeric material.

Further aspects of the present invention will be made apparent from the paragraphs that follow.

BRIEF DESCRIPTION OF THE DRAWING(S)

The present invention will now be described in connection with the drawings appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

It is noted that the present invention is described in connection with aircraft. The present invention should not be understood, however, to be limited to aircraft. The isolation mount of the present invention may be employed with other vehicles including, but not limited to, automobiles, boats, ships, trains, etc.

Figure 1:
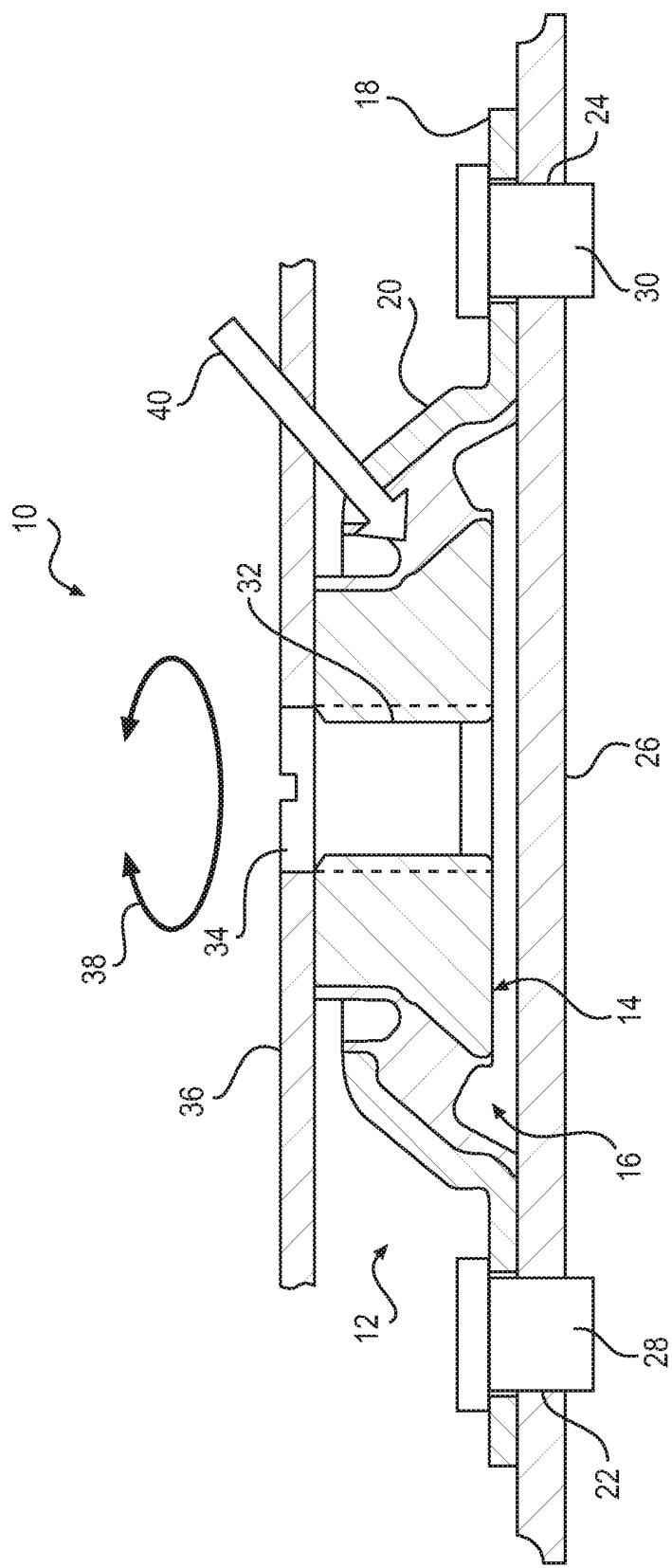
FIG. 1 is a cross-sectional, side view of an isolation mount that is known in the prior art.
Figure 2:
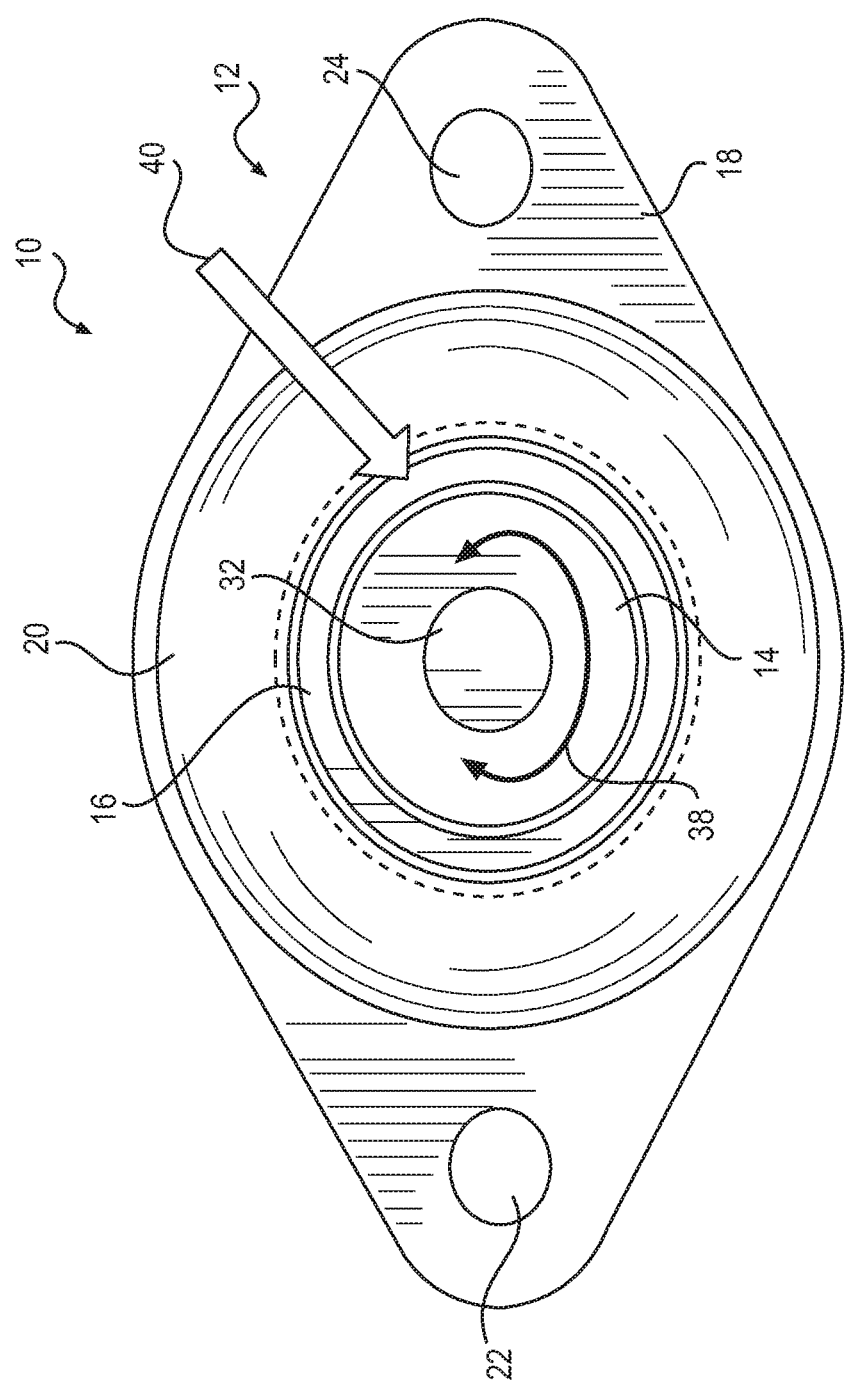
FIG. 2 is a top view of the prior art isolation mount illustrated in FIG. 1.

FIGS. 1 and 2 illustrate one example of a prior art isolation mount 10 that assists with a discussion of one of the failings in the prior art. For reference, FIGS. 1 and 2 are taken from U.S. Patent Application Publication No. 2008/0067726.

FIG. 1 is a cross-sectional, side view of the prior art isolation mount 10. The isolation mount 10 includes a housing 12 surrounding a fastener receiver 14. A rubber damper 16 connects the housing 12 to the fastener receiver 14.

As illustrated in FIG. 1 and in FIG. 2, the housing 12 includes a base 18 integrally formed with a damper case 20. The base 18 includes two openings 22, 24 that permit the housing 12 to be attached to the structure 26 of the aircraft via fasteners 28, 30.

The fastener receiver 14 is positioned centrally within the damper case 20 and is separated from the damper case 20 by the rubber damper 16. The fastener receiver 14 includes an opening 32 to receive a fastener 34 therein. The fastener 34 secures the aircraft interior panel 36 to the fastener receiver 14.

As noted above, those skilled in the art have experienced difficulties with isolation mounts, like the prior art isolation mount 10, when a fastener 34 is inserted into and/or removed from the opening 32. For the illustrated isolation mount 10, the fastener 34 typically is a threaded fastener, such as a screw. The opening 32 defines a complimentary, threaded bore in the fastener receiver 14.

When fastener 34 is inserted into the opening 32 or removed from the opening 32, the fastener 34 is rotated in the directions of the arrows 38. During rotation of the fastener 34, it is possible that the torque applied to the fastener 34 may be transmitted to the fastener receiver 14, causing the fastener receiver 14 to rotate together with the fastener 34 in the direction of the arrows 38. Depending upon the torque applied to the fastener 34 and the degree of rotation of the fastener receiver 14, it is possible that the rubber damper 16 may be damaged or destroyed as a result of the rotational movement of the fastener receiver 14. More specifically, the rubber damper 16 may tear away from the housing 12 due to shear forces applied to it as a result of an over-torque of the fastener 34. One possible location of damage to the rubber damper 16 is indicated by the arrow 40. As should be apparent, if the rubber damper 16 tears, or otherwise separates from one or both of the housing 12 or the fastener receiver 14, the isolation mount 10 is unlikely perform as designed.

Together with other features, the present invention reduces and/or eliminates the possibility of damage to the damper by providing a panel facing surface that provides a high coefficient of friction between the fastener receiver and the panel, thereby providing an increase in rotational resistance between the fastener receiver and the panel. The high coefficient of friction discourages rotation of the fastener receiver when a fastener is inserted therein or removed therefrom. As such, the potential for damage to the damper is greatly reduced and/or eliminated. Details associated with the isolation mount of the present invention are discussed in connection with FIGS. 3-6.

Figure 3:
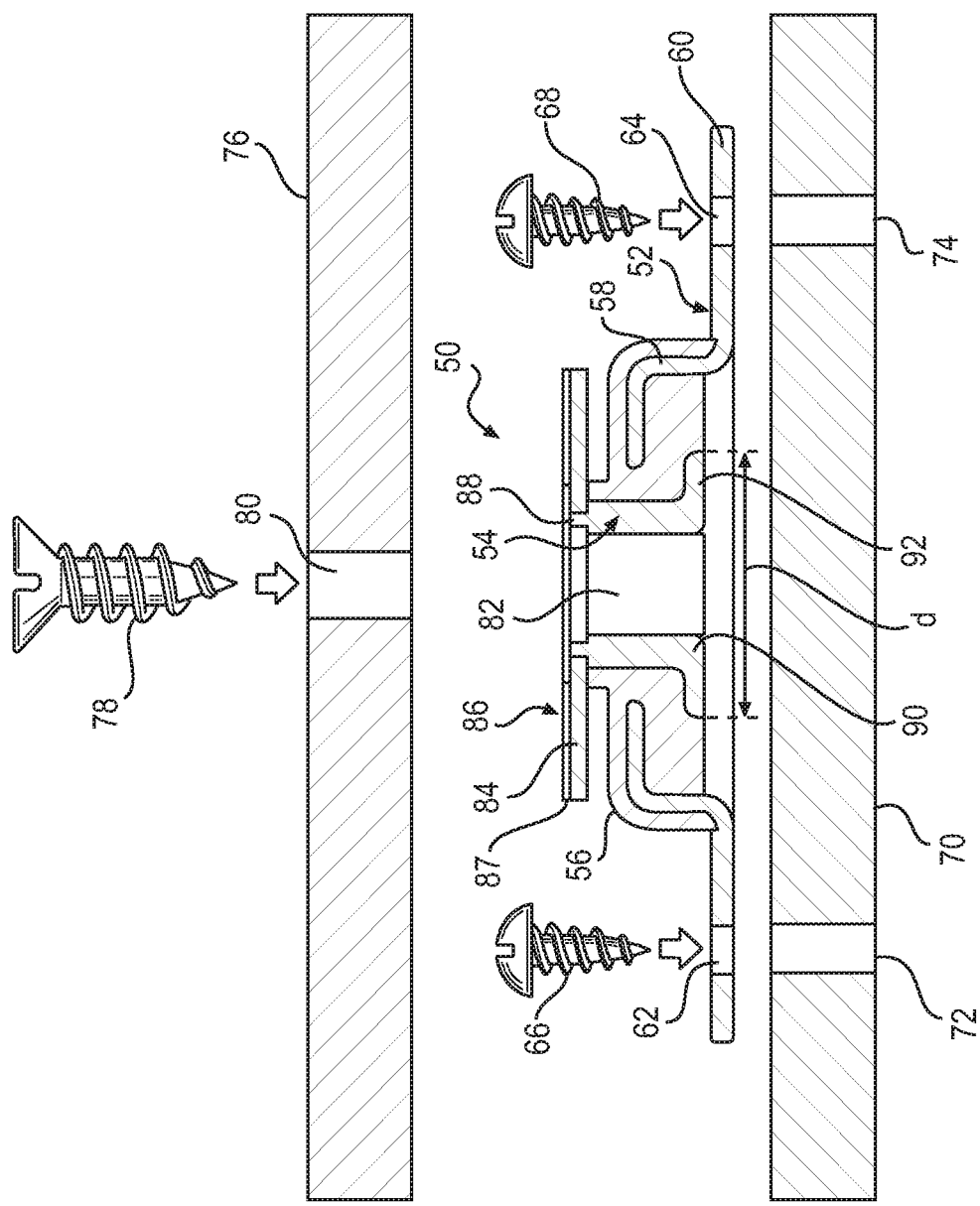
FIG. 3 is an exploded, cross-sectional side view of a first embodiment of the isolation mount of the present invention.

FIG. 3 is an exploded, cross-sectional side view of a first embodiment of an isolation mount 50 according to the present invention. The isolation mount includes a housing 52 that surrounds a fastener receiver 54. A damper 56 elastically connects the housing 52 to the fastener receiver 54.

As will be explained in more detail below, the housing 52 is suitable for being attached to a structure 70, which may be an aircraft structure, and the fastener receiver 54 is suitable for being attached to a panel 76, which may be an interior panel for an aircraft passenger cabin. The damper 56 elastically connects the housing 52 to the fastener receiver 54 so as to reduce the vibrations that are transferred from the structure 70 to the panel 76.

In accordance with the present invention, the fastener receiver 54 comprises a panel-facing surface 86 that is fixed in relation to the body 90 of the fastener receiver 54. The panel-facing surface 86 provides a high coefficient of friction between the panel-facing surface 86 and the panel 76, for preventing shearing of the damper 56 if/when a fastener 78 is rotated or torqued within the receiver opening 82. More specifically, the panel-facing surface 86 provides rotational resistance between the panel-facing surface 86 of the fastener receiver 54 and the panel 76 when applying torque to a fastener 78.

The housing 52 is contemplated to be made from a suitable material such as metal. The metal may be steel, an alloy of iron, aluminum, an alloy of aluminum, titanium, an alloy of titanium, copper, and/or an alloy of copper, for example. Alternatively, the housing 52 may be made from a non-metal material including, but not limited to, plastic materials, thermoplastic materials, polymer materials, natural materials, ceramics, composite materials, and the like.

While the precise material used for the housing 52 is not critical to the present invention, the material is contemplated to be selected from candidates that are light (low in mass/weight), strong, durable, and demonstrate long service lives.

As a general rule, light or low weight materials are preferred for aircraft components so that the components add as little weight to the aircraft as possible. This is especially true, as here, where there are hundreds or thousands of the same component, i.e., the isolation mount 50, may be installed on a single aircraft.

Separately, it is contemplated that the material for the housing 52 may be selected to be sufficiently strong, durable, and robust to withstand the vibrations transmitted to the housing 52 by the aircraft. For example, the material is contemplated to bear the weight of the panel 76, while also resisting cyclic wear from the vibrations and sounds transmitted to the housing 52.

For the isolation mount 50, it is contemplated that the fastener receiver 54 may be made from any of the same materials selected for the housing 52. It is not necessary for the fastener receiver 54 to be made from the same material as the housing 52. However, it is contemplated that selection of the same material for the fastener receiver 54 may simplify the construction of the isolation mount 50.

As discussed in connection with the housing 52, the fastener receiver 54 may be made from metal, for example. Metals include, but are not limited to, steels, an alloys of iron, aluminum, alloys of aluminum, titanium, alloys of titanium, copper, and/or alloys of copper. As with the housing 52, the fastener receiver 54 may be made from a non-metal material including, but not limited to, plastic materials, thermoplastic materials, polymer materials, natural materials, ceramics, composite materials, and the like. While the precise material used for the fastener receiver 54 is not critical to the present invention, the material selected for manufacture of the fastener receiver 54 is contemplated to be light (low) in weight, strong, durable, robust, and long-lived, as discussed in connection with the housing 52.

The damper 56 is contemplated to be made from an elastomeric material such as rubber. While rubber is contemplated for the damper 56, the damper 56 may be made from any alternative elastomeric material without departing from the present invention.

The material selected for the damper 56 is contemplated to be flexible and also to reduce the transmission of sound and/or vibration(s) therethrough. The material selected for the damper 56 also is contemplated to be lightweight and able to provide a suitable lifetime of functionality commensurate in duration with the lifetime of the aircraft.

Figure 4:
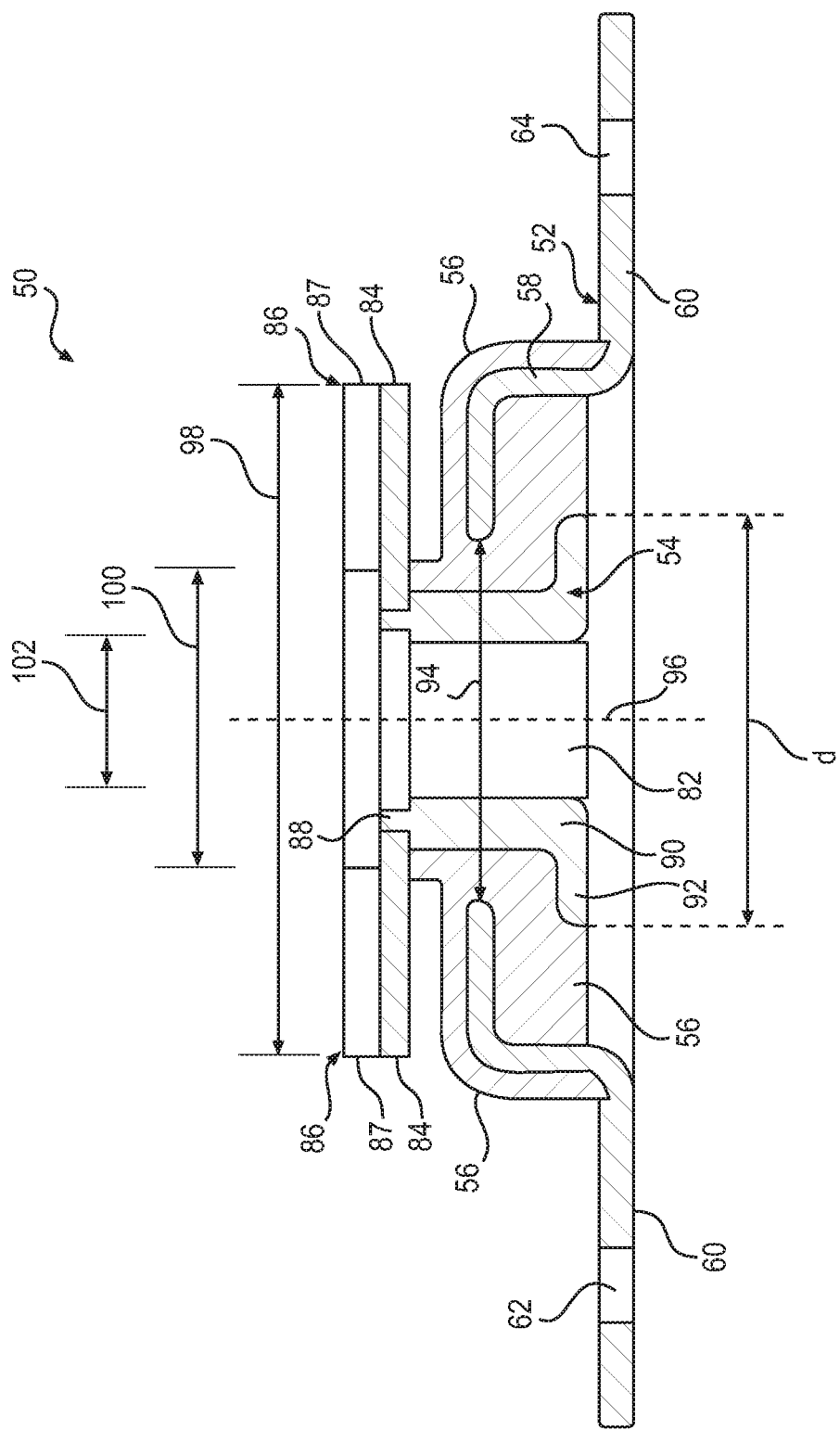
FIG. 4 is an enlarged, cross-sectional side view of the first embodiment of the isolation mount of the present invention illustrated in FIG. 3, with selected details highlighted for discussion purposes.

As should be apparent from FIGS. 3 and 4, the damper 56 encapsulates a portion of the housing 52. The portion of the housing 52 encapsulated by the damper 56 is referred to as the damper case 58.

With respect to the illustrated embodiment, it is contemplated that the damper 56 may be molded around the damper case 58. In particular, the damper 56 may be injection molded around the damper case 58 and the fastener receiver 54. Injection molding, however, is only one contemplated method for manufacturing the isolation mount 50. It is contemplated that the damper 56 and the housing 52 may be co-molded.

The housing 52 is contemplated to include a base 60. In the illustrated example, the base 60 is integral with the damper case 58. In particular, it is contemplated that the housing 52 is stamped from a sheet of metal, such as steel. Alternatively, the housing 52 may be molded from any other material including, but not limited to plastic, as noted above.

Separately, it is contemplated that the housing 52 may be made from separate components that are assembled together. For example, the base 60 and the damper case 58 may be manufactured separately and connected to one another via a suitable means, such as welding, brazing, adhesives, or the like.

The base 60 of the housing 52 includes a first fastener opening 62 and a second fastener opening 64. The first fastener opening 62 receives a first fastener 66 therethrough. The second fastener opening 64 receives a second fastener 68 therethrough, for securing the housing 52 to the structure 70. Although two fastener openings 62, 64 are shown in the example, any number of fastener openings 62, 64 may be used without departing from the present invention.

So that the isolation mount 50 may be attached to the aircraft structure 70, the aircraft structure 70 includes a first structure opening 72 and a second structure opening 74. The first structure opening 72 receives the first fastener 66 therein. The second structure opening 74 receives the second fastener 68 therein.

While it is contemplated that the isolation mount 50 may be affixed to the aircraft structure 70 via one or more fasteners 66, 68, illustrated as threaded screws, the isolation mount 50 may be attached to the aircraft structure 70 via any other means that would be available to those skilled in the art. For example, the isolation mount 50 may be affixed to the aircraft structure 70 using rivets. Still further, it is contemplated that the isolation mount 50 may be attached to the aircraft structure 70 via welding, brazing, adhesives, etc. In one additional contemplated embodiment, the housing 52 may be integral to the structure 70, in whole or in part.

For clarity, the aircraft structure 70 refers to the structure of the aircraft forming the fuselage. Those skilled in the art may also refer to the aircraft structure 70 as the "green structure" of the aircraft, due to the color of the primer applied to many of the components forming the aircraft structure 70. As should be apparent, however, the present invention is not limited to connection to any particular structure on the aircraft.

With continued reference to FIG. 3, the isolation mount 50 connects an aircraft panel 76 by a fastener 78 that extends through a panel opening 80. The fastener 78 engages a receiver opening 82 in the fastener receiver 54.

In the illustrated embodiment, the fastener 78 is contemplated to be a threaded fastener. To receive the threaded fastener 78, the body 90 of the fastener receiver 54 is contemplated to provide a complimentary, threaded bore.

It is contemplated that the fastener 78 is threaded so that the fastener 78 may be removed from the fastener receiver 54. With such a construction, the aircraft panel 76 may be disengaged from the isolation mount 50 and, thereby, separated from aircraft structure 70. It may be necessary to remove the aircraft panel 76, for example, to access the aircraft structure 70 and/or components positioned adjacent to the aircraft structure 70. As should be apparent to those skilled in the art, the aircraft panel 76 may need to be removed to perform a repair or to conduct routine maintenance.

Since it may be necessary to remove and reattach the aircraft panel 76 to the isolation mount 50 multiple times during the lifetime of the aircraft, the damper 56 may be subjected to repeated rotational stresses. As noted above, each instance of insertion of the panel fastener 78 into the fastener receiver 54 potentially may damage the damper 56. Similarly, each time that the panel fastener 78 is removed from the fastener receiver 54, the damper 56 may be damaged by the rotational stresses exerted thereon.

To prevent, reduce and/or minimize damage to the damper 56, the fastener receiver 54 comprises a panel-facing surface 86 that defines a high coefficient of friction with the panel 76. The panel-facing surface 86 is in a fixed relationship with the body 90 of the fastener receiver 54 so as to prevent over rotation of the fastener receiver 54 in relation to the damper 56 when fastener 78 is being inserted into the receiver opening 82.

In the non-limiting embodiment shown, the fastener receiver 54 comprises a plate 84 that provides the panel-facing surface 86. As such, the plate 84 is fixed in relation to the body 90 of the fastener receiver 54. As shown, the plate 84 may be positioned above the damper 56, such that a space exists between the plate 84 and the damper 56. In an alternative embodiment, the plate 84 may sit directly on top of the damper 56.

In a non-limiting embodiment, the high coefficient of friction of the panel-facing surface 86 is provided by a layer 87 disposed on at least a portion of the surface of the plate 84 that faces the aircraft panel 76.

The layer 87 is contemplated to be a material, film, and/or surface treatment that presents a sufficiently high coefficient of friction when in contact with the panel 76 to resist rotation when a torque is applied to the panel fastener 78. The layer 87 is not intended to be limited to any particular embodiment.

As indicated above, the plate 84 is fixed in relation to the body 90 that defines the receiver opening 82. As such, the plate 84 may be integrally formed with a body 90 of the fastener receiver 54, such that it may be made from any of the materials listed for the manufacture of the housing 52 and the fastener receiver 54. Still further materials may be employed, as should be apparent to those skilled in the art. While the precise material used for the plate 84 is not critical to the present invention, it is contemplated that the selected material is light (low) in weight, strong, and durable as discussed in connection with the housing 52 and with the fastener receiver 54.

Alternatively, the plate 84 is contemplated to be connected to the body 90 of the fastener receiver 54 at a cylindrical protrusion 88 extending upwardly from the body 90 of the fastener receiver 54. The plate 84 may be connected to the cylindrical protrusion 88 via any suitable connection such as brazing, welding, adhesives, etc. Still further, the plate 84 may threadedly engage complimentary threads on the exterior of the cylindrical protrusion 88.

Figure 5:
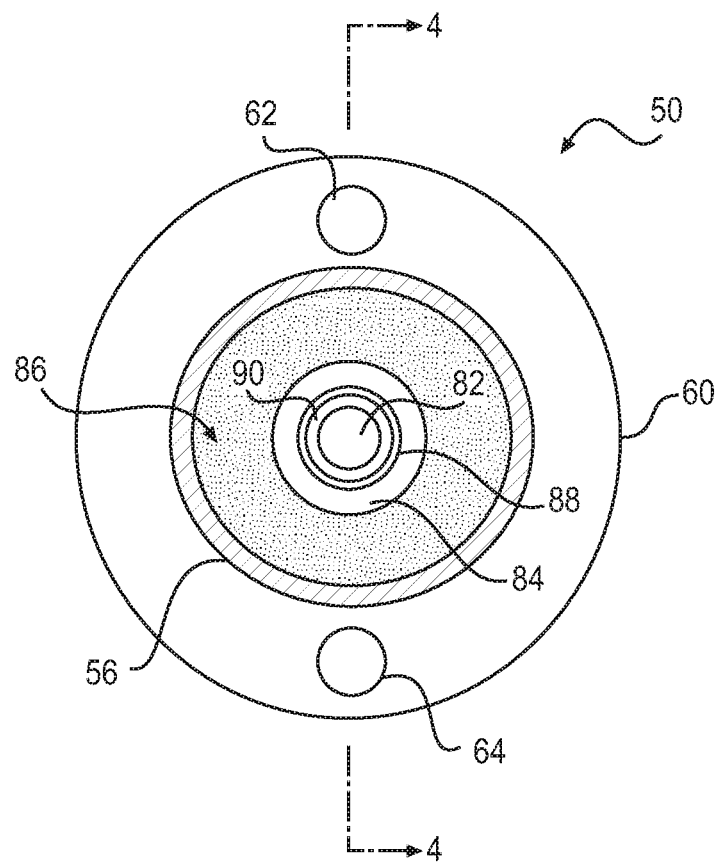
FIG. 5 is a top view of the first embodiment of the isolation mount of the present invention, shown in FIGS. 3 and 4.

Concerning the fastener receiver 54 illustrated in FIGS. 3-5, the body 90 includes a flange 92 at a bottom end thereof. As shown, the flange 92 may be flush with the bottom side of the damper 56. The flange 92 may be provided to help stabilize the fastener receiver 54 in relation to the housing 52. The flange 92 also prevents the fastener receiver 54 from disengaging from the housing 52, should the damper 56 become separated from the fastener receiver 54 and/or the housing 52. In particular, the flange 92 has a diameter "d" greater than the opening 94 in the damper case 58.

In the illustrated embodiment, the layer 87 is disposed on the top surface of the plate 84. The layer 87 is positioned so that the layer 87 contacts the surface of the panel 76.

The layer 87 is contemplated to be made from a material that exhibits a sufficiently high coefficient of friction when pressed against the panel 76 to prevent or minimize rotation of the plate 84 around the longitudinal axis 96 of the fastener receiver 54. Since the plate 84 is fixed in relation to the body 90 of the fastener receiver 54, the layer 87 inhibits rotation of the fastener receiver 54 with respect to the axis 96.

In a further contemplated embodiment, the layer 87 may be applied both to the plate 84 and also to the panel 76. As such, the layer 87 need not be limited to only the plate 84 or the panel 86.

Concerning materials that may be employed for the layer 87, the present invention is not intended to be limited to any particular substance. Certain properties of materials, however, are contemplated to be desirable. For example, the material should exhibit a sufficiently high coefficient of friction with respect to the panel 76 to inhibit the rotation of the plate 84 with respect to the panel 76. In other words, the material provides rotational resistance between the fastener receiver 54 and the panel 76. Elastomeric materials are contemplated to satisfy this criteria, among others. Rubber may be selected, but the present invention should not be limited to rubber and/or materials equivalent to rubber.

Tacky materials may be particularly well-suited for the layer 87. In one contemplated embodiment, the layer 87 may be selected as a film of a releasable adhesive, similar to the type of releasable adhesive found on repositionable paper note sheets that may be used in an office environment. Releasable adhesives are understood to exhibit high coefficients of friction. Releasable adhesives also are understood to be able to engage and disengage an opposing surface repeatedly. As noted above, since the panel 76 is contemplated to be removable, it is desirable to select a material for the layer 87 that facilitates multiple iterations of installation and removal of the same panel 76.

In an alternative embodiment, the panel-facing surface 86 that provides the high coefficient of friction with the panel 78 may not comprise a layer 87. Instead, the panel-facing surface 86 may provide the high coefficient of friction with the panel 76 due to a surface treatment on the plate 84. For example, the plate 84 may be subjected to a grinding or knurling process that produces a roughened or serrated surface. Still further, both the plate 84 and the panel 76 may be subjected to surface treatments to increase the coefficient of friction therebetween.

As should be apparent from the foregoing, there are a large variety of materials and/or surface treatments that may be employed to the plate 84, such that the panel-facing surface 86 provides a high coefficient of friction. The present invention is not intended to be limited to any particular material and/or surface treatment.

When the panel 76 is pressed against the panel-facing surface 86 of the fastener receiver 54, the coefficient of friction inherent in the panel-facing surface 86 effectively causes the fastener receiver 54 to "stick" to the panel 76. Pressure between the panel 76 and the panel-facing surface 86 may be created by the insertion of the panel fastener 78 into the receiver opening 82. Pressure between the panel 76 and the panel-facing surface 86 also may be established by the weight of the panel 76, pressure applied by an external device, or pressure from an individual installing and/or removing the panel 76, among other sources.

FIG. 4 illustrates the isolation mount 50 in an enlarged detail. In this cross-sectional side view, by comparison with FIG. 3, the layer 87 is exaggerated in thickness for emphasis and for clarity. It is noted that the thickness of the layer 87 is not critical to the present invention.

FIG. 5 is a top view of the isolation mount 50 according to the present invention. The isolation mount 50 is illustrated as being circular in shape. While a circular shape is considered to be a simple shape for the isolation mount 50, the isolation mount may be provided with any other alternative shape without departing from the scope of the present invention.

As should be apparent to those skilled in the art, one definition for the static coefficient of friction is a ratio between a force needed to move an object on a surface and a force between the object and the surface due to the pressure of the object against the surface. There are a number of variables that affect the static coefficient of friction including, but not limited to the material from which the object is made, the material from which the surface is made, surface treatments applied to the object, any treatments applied to the surface, etc. Separately, the pressure between the object and the surface (i.e., including the weight of the object on the surface) also influences the static coefficient of friction.

With renewed reference to FIGS. 4 and 5, as also should be apparent to those skilled in the art, the contact area between the object and the surface influences the coefficient of friction. For the isolation mount 50 according to the present invention, the panel-facing surface 86 is formed as a disk-shaped element with an outer diameter 98 and an inner diameter 100. For reference, the inner diameter 100 is larger than the diameter 102 of the receiver opening 82 in the fastener receiver 54.

Relying on simple geometry, the area, A, of the layer 86 is calculated by the following equation (1):

$$A = \pi \cdot (R^2 - r^2) \tag{1}$$

Here, the larger radius, R, is the outer diameter 98. The smaller diameter, r, is the inner diameter 100.

Since the present invention is described in connection with a circularly-shaped isolation mount 50, the panel-facing surface 86 is disk-shaped. The present invention, however, is not intended to be limited solely to embodiments employing disk-shaped panel-facing surfaces 86. To the contrary, the panel-facing surface 86 may be provided with any shape as required or as desired without departing from the scope of the present invention.

Concerning the coefficient of friction, it is contemplated that a static coefficient of friction of greater than or equal to 1.5 may be suitable in most instances. As should be apparent from the foregoing, however, the present invention is not contemplated to be limited to static coefficients of friction of greater than or equal to 1.5.

As noted above, the panel-facing surface 86 is contemplated to present a friction area A that defines a contact area between the panel 76 and the plate 84. Naturally, the size of the friction area A depends upon the coefficient of friction between the panel 76 and the plate 84. The greater the coefficient of friction, the smaller the friction area A needed. Conversely, the smaller the coefficient of friction, the larger the friction area A is expected to be to minimize rotation of the plate 84 around the longitudinal axis 96, as discussed above.

Figure 6:
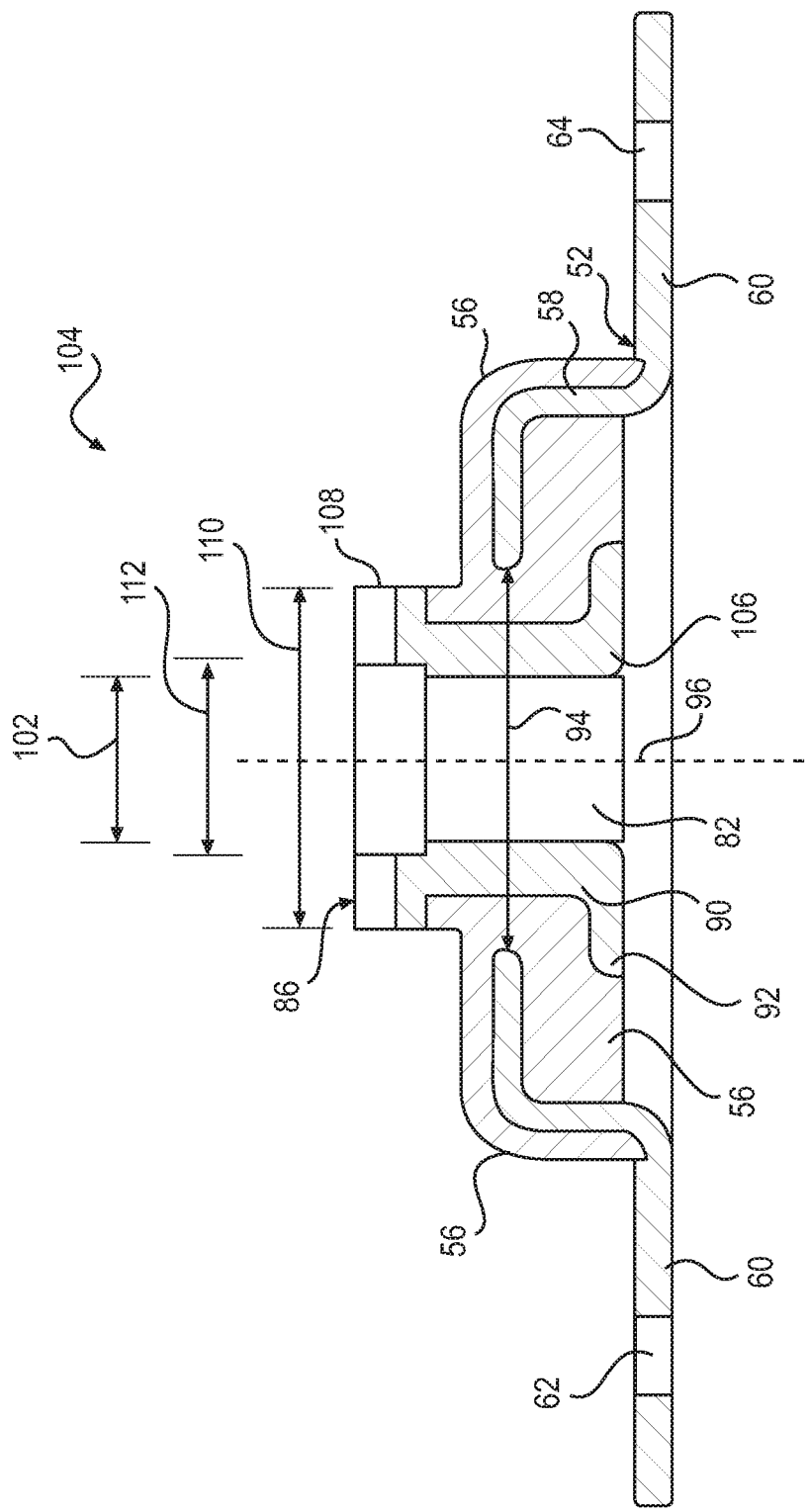
FIG. 6 is a cross-sectional, side view of a second embodiment of the isolation mount according to the present invention.

To this end, it is contemplated that, if the panel facing surface 86 provides a sufficient rotational resistance between the fastener receiver 54 and the panel 76, the plate 84 may be eliminated from the isolation mount 50 altogether. In particular, it is contemplated that the panel-facing surface 86 that contacts the panel 76 may be defined by a smaller surface area of the fastener receiver 54 than was provided by the plate 84. FIG. 6 illustrates this contemplated embodiment.

FIG. 6 illustrates a second embodiment of an isolation mount 104. Here, the fastener receiver 106 does not include the cylindrical protrusion 88. In addition, the plate 84 is not provided. Instead, the layer 108, like the layer 87, is provided on a panel-facing surface 86 of the fastener receiver 106. In all other respects, for simplicity, the isolation mount 104 incorporates the same features as the isolation mount 50 according to the first embodiment of the present invention.

In this second embodiment, like the layer 87, the layer 108 also is contemplated to be disk-shaped. However, the area, A, of the layer 108 is smaller than the area A associated with the isolation mount 50. In particular, the outer diameter 110 is smaller than the outer diameter 98. The inner diameter 112 also is smaller than the inner diameter 100.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. An isolation mount connecting a panel to a structure, comprising:
   a housing disposable on the structure;
   a fastener receiver comprising a panel-facing surface; and
   a damper connecting the housing to the fastener receiver;
   the panel-facing surface of the fastener receiver defining a static coefficient of friction between the panel-facing surface and the panel discouraging rotation of panel-facing surface around a longitudinal axis, wherein a layer of material disposed on the fastener receiver defines the panel-facing surface, and wherein the static coefficient of friction between the panel-facing surface and the panel is greater than or equal to 1.5.

2. The isolation mount of claim 1, wherein the layer of material comprises at least one of an elastomeric material, rubber, a tacky material, and a releasable adhesive.

3. The isolation mount of claim 1, wherein the panel-facing surface comprises one of a knurled, grinded, or serrated surface.

4. The isolation mount of claim 1, wherein the fastener receiver comprises:
   a body; and
   a plate in fixed relationship with the body, wherein the plate defines the panel-facing surface.

5. The isolation mount of claim 1, wherein the housing comprises:
   a damper case enclosing the damper; and
   a base connected to the damper case,
   wherein the base is connectable to the structure.

6. The isolation mount of claim 5, wherein the base is connectable to the structure by at least one structure fastener.

7. The isolation mount of claim 1, wherein the fastener receiver comprises:
   a body;
   a flange disposed at one end of the body, interior to the housing; and
   a receiver opening in the body for receiving a panel fastener therein, permitting the fastener receiver to be connected to the panel.

8. The isolation mount of claim 1, wherein the damper comprises an elastomeric material.

9. A vehicle, comprising:
   a structure;
   a panel; and
   a plurality of isolation mounts connecting the panel to the structure, wherein each isolation mount comprises:
   a housing disposed on the structure;
   a fastener receiver comprising a panel-facing surface; and
   a damper connecting the housing to the fastener receiver;
   the panel-facing surface of the fastener receiver defining a static coefficient of friction between the panel-facing surface and the panel discouraging rotation of the panel-facing surface around a longitudinal axis, wherein a layer of material disposed on the fastener receiver defines the panel-facing surface, and wherein the static coefficient of friction between the panel-facing surface and the panel is greater than or equal to 1.5.

10. The vehicle of claim 9, wherein the layer of material comprises at least one of an elastomeric material, rubber, a tacky material, and a releasable adhesive.

11. The vehicle of claim 9, wherein the panel-facing surface comprises one of a knurled, grinded, or serrated surface.

12. The vehicle of claim 9, wherein the structure comprises part of an aircraft fuselage and the panel forms part of an aircraft interior cabin.

13. The vehicle of claim 9, wherein the fastener receiver comprises:
   a body; and
   a plate in fixed relationship with the body, wherein the plate defines the panel-facing surface.

14. The vehicle of claim 9, wherein the housing comprises:
   a damper case enclosing the damper; and
   a base connected to the damper case,
   wherein the base connects to the structure.

15. The vehicle of claim 9, wherein the fastener receiver comprises:
   a body;
   a flange disposed at one end of the body, interior to the housing; and
   a receiver opening in the body for receiving a panel fastener therein, permitting the fastener receiver to be connected to the panel.

16. The vehicle of claim 9, wherein the damper comprises an elastomeric material.

\* \* \* \* \*